United States Patent
Kimura et al.

(10) Patent No.: US 6,787,236 B2
(45) Date of Patent: Sep. 7, 2004

(54) HARD COAT FILM (75) Inventors: Tatsuya Kimura, Saitama (JP); Yutaka Onozawa, Saitama (JP); Tomoo Ohrui, Saitama (JP); Toshio Sugizaki, Saitama (JP)

(73) Assignee: LINTEC Corporation, Tokyo (JP)

( * ) Notice: Subject to any disclaimer, the term of this patent is extended or adjusted under 35 U.S.C. 154(b) by 0 days.

(21) Appl. No.: 10/192,707

(22) Filed: Jul. 11, 2002

(65) Prior Publication Data

US 2003/0096119 A1 May 22, 2003

(30) Foreign Application Priority Data

Jul. 17, 2001 (JP) ........................................ 2001-216284

(51) Int. Cl.⁷ .............................................. B32B 27/36
(52) U.S. Cl. ....................... 428/412; 428/141; 428/143; 428/331; 428/323; 428/325; 528/196; 528/198
(58) Field of Search ................................ 428/412, 141, 428/143, 331, 323, 325; 528/196, 198

(56) References Cited

U.S. PATENT DOCUMENTS

| 5,393,443 A | | 2/1995 | Satake et al. | |
|---|---|---|---|---|
| 5,409,778 A | | 4/1995 | Patel | |
| 5,925,438 A | * | 7/1999 | Ota et al. | 428/141 |

FOREIGN PATENT DOCUMENTS

| EP | 0 816 466 | 1/1998 |
|---|---|---|
| EP | 1 174 260 | 1/2002 |

* cited by examiner

Primary Examiner—Terressa Boykin
(74) Attorney, Agent, or Firm—Oblon, Spivak, McClelland, Maier & Neustadt, P.C.

(57) ABSTRACT

Provided is a hard coat film which has an inorganic hard coat layer having excellent scratch resistance and weatherability and inhibited from generation of curling and which is particularly suited for sticking on outside faces of window glasses in lofty buildings. The hard coat film is prepared by laminating in order a primer layer and a hard coat layer comprising metal oxide particles and a cured matter of a silane compound on one face of a base material and further providing, if necessary, a coating layer having various functions on the above hard coat layer.

17 Claims, 1 Drawing Sheet

HARD COAT FILM

BACKGRAOUND OF THE INVENTION

The present invention relates to a hard coat film. More specifically, the present invention relates to a hard coat film having an inorganic hard coat layer having excellent scratch resistance and weatherability, in which curling is inhibited from being generated and which is particularly suited for sticking on outside faces of window glasses and plastic boards for windows in lofty buildings and affixing on show windows.

RELATED ART

Plastic films having various functions, for example, at least one of a ultraviolet (hereinafter referred to as "UV") ray-shielding function, an infrared ray-shielding function, a see-through preventing function, contamination preventing function and a broken piece-scattering preventing function have so far been used as films for sticking on window glasses and plastic boards for windows (hereinafter called a window film) for various purposes.

In recent years, it has been found that semiconductors such as titanium oxide have a strong photocatalytic action, and since then, development of photocatalysts and researches thereof for putting them to practical use have actively been carried out. In these photocatalysts, when a semiconductor represented by, for example, titanium oxide is excited by light having energy higher than in a band gap thereof, an electron is produced in a conduction band, and a positive hole is produced in a valence band, wherein this electron—positive hole pair which is rich in energy is utilized. Investigated by applying such photocatalytic action are, for example, decomposition and removal of various substances which are contained in waste water and waste gas and which are problems on environmental pollution, deodorization, prevention of contamination, antibacterial treatment and sterilization.

Further, it is known that in such photocatalysts, irradiation thereof with light having energy higher than in a band gap produces, as described above, an electron in a conduction band of the photocatalysts and a positive hole in a valence band thereof and that this action of an electron and/or a positive hole provides the surface with polarity to provide it with extrahydrophilicity.

Accordingly, it has been tried to provide a photocatalytic function layer on the surface of window film making use of such extrahydrophilicity and contamination prevention performance of a photocatalyst and stick this film on the outside surface of window glass. This trial aims to naturally clean (self-cleaning) stains (organic matters) stuck on the film surface by repetition of irradiation with sunlight and rain-fall without cleaning them by making use of the extrahydrophilicity and contamination prevention performance thereof and to prevent the window glass from being clouded and secure visibility in rainy weather.

In such window film, a hard coat layer is usually disposed for the purpose of providing it with a scratch resistance. This hard coat layer is classified roughly into an organic base and an inorganic base, and known as the organic base hard coat layer is a layer obtained by applying on a base film, for example, an ionizing radiation-curing type resin composition such as a polyester acrylate base, an epoxy acrylate base, a urethane acrylate base and a polyol acrylate base and curing it. On the other hand, known as the inorganic base hard coat layer is a metal oxide layer formed by a sol-gel method, for example, a cured matter layer of a silane compound. In such hard coat layers, the inorganic base hard coat layer is advantageous when, for example, a photocatalytic function layer is disposed thereon, since if it is the organic base hard coat layer, the above hard coat layer is quickly deteriorated by virtue of a photocatalytic function. However, though the inorganic base hard coat layer is excellent in a scratch resistance, contraction takes place in the layer comprising metal oxide in curing when the layer comprising metal oxide is formed by the sol-gel method, and curling can not be avoided from being generated in the film. In addition thereto, there is the problem that it does not have a satisfactory weatherability and is liable to cause cracks with the passage of time.

DISCLOSURE OF THE INVENTION

The present invention has been made under such circumstances, and an object thereof is to provide a hard coat film having an inorganic hard coat layer having excellent scratch resistance and weatherability and, if desired, provided thereon a coating layer having various functions, in which curling is inhibited from being generated and which is suited particularly for sticking on outside faces of window glasses and plastic boards for windows in lofty buildings and sticking on show windows.

Intensive researches repeated by the present inventors in order to achieve the object described above have resulted in finding that capable of being suited to the object is a film or a laminate which has a specific structure and in which a hard coat layer comprises a cured layer of a mixture containing metal oxide particles and a silane compound. The present invention has been completed based on such knowledge.

Provided are:

(1) A hard coat film which comprises a laminate wherein a primer layer and a hard coat layer comprising metal oxide particles and a cured matter of a silane compound are laminated in order on one face of a base material,
(2) the hard coat film as described in the above item (1), wherein a coating layer is further provided on the hard coat layer,
(3) the hard coat film as described in the above item (2), wherein the coating layer is a layer having at least one function selected from a photocatalytic function, an infrared ray-shielding function, a UV ray-shielding function, an antibacterial function, a contamination preventing function, an antistatic function, a color developing function and a cloudiness preventing function,
(4) the hard coat film as described in the above item (3), wherein the coating layer is a photocatalytic function layer, and the base material comprises polycarbonate, and
(5) the hard coat film as described in any of the above items (1) to (4), wherein an adhesive layer is provided on the other face of the base material.

DESCRIPTION OF CODES

1 Base material
2 Primer layer
3 Hard coat layer
4 Coating layer
5 Adhesive layer
6 Release layer
10 Hard coat film

BEST MODE FOR CARRYING OUT THE INVENTION

The hard coat film of the present invention has a structure in which the hard coat layer is provided on one face of the base material via the primer layer.

The base material described above shall not specifically be restricted, and capable of being used is a base material suitably selected according to the circumstances, from base materials comprising various plastics, for example, polyolefin base resins such as polyethylene, polypropylene, poly-4-methylpentene-1 and polybutene-1, polyester base resins such as polyethylene terephthalate and polyethylene naphthalate, polycarbonate base resins, polyvinyl chloride base resins, polyphenylene sulfide base resins, polyether sulfone base resins, polyethylene sulfide base resins, polyphenylene ether base resins, styrene base resins, acryl base resins, polyamide base resins, polyimide base resins and cellulose base resins such as cellulose acetate.

A thickness of this base material shall not specifically be restricted and can suitably be selected from a range of usually 5 to 500 μm, preferably 10 to 300 μm and more preferably 10 to 200 μm according to the use purposes.

The base material used in the present invention is preferably transparent, but it may be colored or vapor-deposited or may contain a UV absorber. Further, one face or both faces thereof can be subjected, if desired, to surface treatment by an oxidation method or a roughening method for the purpose of elevating the adhesive property with a layer provided on the surface thereof. The oxidation method described above includes, for example, corona discharge treatment, chromic acid treatment (wet type), flame treatment, hot air treatment and ozone-UV ray irradiation treatment. The roughening method includes, for example, a sand blast method and a solvent treating method. These surface treating methods can suitably be selected according to the kind of the base material, and usually the corona discharge treating method is preferably used in terms of an effect and an operating property.

In the present invention, the primer layer provided on one face of the base material described above shall not specifically be restricted as long as it has a good adhesive property with the hard coat layer provided thereon and the base material described above, and capable of being used are conventionally known primers, for example, primers of an acryl base, a polyester base, a polyurethane base, a silicone base and a rubber base. Acryl base and polyester base primers are suited in terms of a durability and an adhesive property. This primer can contain, if necessary, a UV absorber and a light stabilizer. The UV absorber and the light stabilizer can be added in a range of 0.01 to 10 parts by weight, preferably 0.1 to 5 parts by weight per 100 parts by weight of the primer. This primer layer has a thickness falling in a range of preferably 0.1 to 40 μm, particularly suitably 0.5 to 20 μm in terms of an even coating property and an adhesive property. If this thickness is less than 0.1 μm, the adhesive property is likely to be unsatisfactory. On the other hand, if it exceeds 40 μm, it may cause damage of a flexibility of the hard coat film. This primer layer can be formed by applying it on the base material by means of a conventionally known method, for example, a bar coating method, a knife coating method, a roll coating method, a blade coating method, a die coating method, a gravure coating method and a curtain coating method and subjecting it to drying treatment.

In the present invention, a hard coat layer is provided on the primer layer thus formed. The above hard coat layer is a layer comprising metal oxide particles and a cured matter of a silane compound. In this respect, the metal oxide particles include, for example, particles of oxides of metals such as Si, Ge, Sn, Al, In, Ga, Zn, Ti, Zr, Sc, Y and lanthanoid series metals (Ce and the like), complex oxides and metal-doped metal oxides. These metal oxide particles may be used alone or in combination of two or more kinds thereof. The above metal oxide particles have an average particle diameter falling in a range of preferably 1 to 10000 nm, more preferably 10 to 500 nm and further preferably 20 to 200 nm in terms of curl preventing property and hard coat property.

On the other hand, the silane compound includes alkoxysilane compounds and chlorosilane compounds. The alkoxysilane compound shall not specifically be restricted as long as it is a silicon compound having a hydrolyzable alkoxyl group and includes, for example, a compound represented by Formula (I):

$$R^1{}_n Si(OR^2)_{4-n} \tag{I}$$

wherein $R^1$ represents a hydrogen atom or a non-hydrolyzable group, to be specific, an alkyl group, a substituted alkyl group (substituent: a halogen atom, an epoxy group, a (meth)acryloyloxy group and the like), and alkenyl group, an aryl group or an aralkyl group; $R^2$ represents a lower alkyl group; n represents an integer of 0 to 2; and when plural $R^1$ and $OR^2$ are present respectively, plural $R^1$ may be the same or different, and plural $OR^2$ may be the same or different.

The examples of the alkoxysilane compound represented by Formula (I) described above include tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, trimethoxysilane hydride, triethoxysilane hydride, tripropoxysilane hydride, methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, γ-glycidoxypropyltrimethoxysilane, γ-acryloyloxypropyltrimethoxysilane, γ-methacryloyloxypropyltrimethoxysilane, dimethyldimethoxysilane, methylphenyldimethoxysilane, vinyltrimethoxysilane, vinyltriethoxysilane, divinyldimethoxysilane and divinyldiethoxysilane. They may be used alone or in combination of two or more kinds thereof.

In this case, if the alkoxysilane compound in which n is 0 or n is 1 to 2 and in which $R^1$ is a hydrogen atom is completely hydrolyzed, an inorganic silica base cured matter is obtained, and if it is partially hydrolyzed, obtained is a polyorganosiloxane base cured matter or a mixed base cured matter of an inorganic silica base and a polyorganosiloxane base. On the other hand, in the compound in which n is 1 to 2 and $R^1$ is a non-hydrolyzable group, a polyorganosiloxane base cured matter is obtained by partial or complete hydrolysis because of the non-hydrolyzable group.

The chlorosilane compound includes ethyldichlorosilane, ethyltrichlorosilane, dimethyldichlorosilane, trichlorosilane, trimethylchlorosilane, dimethyldichlorosilane and methyltrichlorosilane.

When a photocatalytic function layer is provided as a coating layer on the hard coat layer, a cured matter of a hydrolysis condensation product of the silane compound in the hard coat layer does not preferably have an organic group. Accordingly, it is desired to use tetraalkoxysilane, trialkoxysilane hydride or dialkoxysilane dihydride as the above silane compound and to completely hydrolyze it. However, alkyltrialkoxysilane can be used in combination therewith from the viewpoints of preventing cracks from being generated and the adhesive property with the photocatalytic function layer.

When forming the hard coat layer in the present invention, prepared first is a coating liquid containing the metal oxide particles and the silane compound each described above and a small amount of a hydrolysis catalyst in a suitable solvent. Then, the coating liquid described above is coated on the primer layer formed in the manner described above by means of a publicly known method, for example, a bar coating method, a knife coating method, a roll coating method, a blade coating method, a die coating method, a gravure coating method and a curtain coating method and is subjected to heating treatment at a temperature of 80 to 160° C. for 30 seconds to 5 minutes. If this drying temperature is lower than 80° C., the solvent is likely to remain in the hard coat layer or curing is likely to be insufficient. On the other hand, if it exceeds 160° C., contraction of the base material causes loss of the flatness.

Thus, formed is the hard coat layer which comprises the metal oxide particles and the cured matter of the silane compound and which is excellent in a scratch resistance and a weatherability. The cured matter of the above silane compound is formed by a sol-gel method, and at that time, the metal oxide particles contained therein inhibits the hard coat layer from contracting in drying and curing and prevents curling of the hard coat film from being generated. This effect is efficiently exhibited when the above metal oxide particles are particles having an amorphous property, since they have a good affinity with the cured matter of the silane compound. Suited as the above metal oxide particles are, for example, tin oxide particles and antimony-doped tin oxide (ATO) particles.

A content ratio of the metal oxide particles to the cured matter of the silane compound in the hard coat layer falls preferably in a range of 8:2 to 2:8 in terms of a weight ratio. If an amount of the metal oxide particles is more than the range described above, the hard coat performance is less liable to be sufficiently displayed. On the other hand, if it is less than the range described above, it is likely that an effect of inhibiting curling from being generated is not sufficiently exhibited and that an adhesive property of the hard coat layer with the coating layer provided thereon if desired is reduced. More preferred content ratio of the metal oxide particles to the cured matter of the silane compound is selected in a range of 7:3 to 3:7 in terms of a weight ratio. The above hard coat layer has a thickness falling in a range of usually 1 to 20 $\mu$m. If this thickness is less than 1 $\mu$m, the scratch resistance and the adhesive property with the coating layer provided thereon if desired are less liable to be sufficiently displayed. On the other hand, if it exceeds 20 $\mu$m, a flexibility of the hard coat film is likely to be damaged.

In the present invention, selection of the kind of the metal oxide particles in the hard coat layer makes it possible to provide the above hard coat layer with other functions, for example, a UV ray-shielding function and an infrared ray-shielding function in addition to a hard coat function.

To be specific, used as the metal oxide particles in the hard coat layer are, for example, fine particles of titanium dioxide, zinc oxide and cerium oxide, hybrid particles obtained by subjecting titanium dioxide fine particles to combining treatment with iron oxide and hybrid particles obtained by coating the surfaces of cerium oxide fine particles with amorphous silica, whereby the above hard coat layer is provide with a UV ray-shielding function brought about by scattering a UV ray. Further, used as the metal oxide particles are, for example, metal oxide particles of titanium oxide, silicon dioxide, zinc oxide, indium oxide, tin oxide and zinc sulfide, particularly zinc oxide, ATO (antimony-doped tin oxide) and ITO (indium-doped tin oxide), whereby the above hard coat layer is provide with an infrared ray-shielding function brought about by absorbing an infrared ray.

When the metal oxide particles used in the hard coat layer have a photocatalytic activity, they are preferably subjected to treatment for deactivating a photocatalytic action of the metal oxide particles in order to inhibit the primer layer of a lower layer from being deteriorated by the photocatalytic action thereof and inhibit, when a coating layer containing an organic matter is provided as an upper layer, the above layer from being deteriorated by the photocatalytic action thereof.

In the present invention, a coating layer having various functions can be provided, if desired, on the hard coat layer described above. Capable of being given as this coating layer is a layer having at least one function selected from a photocatalytic function, an infrared ray-shielding function, a UV ray-shielding function, an antibacterial function, a contamination preventing function, an antistatic function, a color developing function and a cloudiness preventing function.

A thickness of the coating layer described above shall not specifically be restricted and is suitably selected according to the functions thereof, and it falls usually in a range of 0.001 to 20 $\mu$m. If this thickness is less than 0.001 $\mu$m, it is likely that the desired function of the coating layer is not sufficiently displayed. On the other hand, if it exceeds 20 $\mu$m, a flexibility of the hard coat film is damaged or cracks are produced to cause deterioration of the visibility.

Next, the coating layer having various functions which is provided, if desired, on the hard coat layer shall be explained.

Photocatalytic Function Layer:

A photocatalyst used in this photocatalytic function layer shall not specifically be restricted and includes conventionally known products, for example, in addition to titanium dioxide, strontium titanate ($SrTiO_3$), barium titanate ($BaTi_4O_9$), sodium titanate ($Na_2Ti_6O_{13}$), zirconium dioxide, $\alpha$-$Fe_2O_3$, tungsten oxide, $K_4Nb_6O_{17}$, $Rb_4Nb_6O_{17}$, $K_2Rb_2Nb_6O_{17}$, cadmium sulfide and zinc sulfide. They may be used alone or in combination of two or more kinds thereof. Among them, titanium dioxide, particularly anatase type titanium dioxide is useful as a practical photocatalyst.

A method for forming the photocatalytic function layer on the hard coat layer described above shall not specifically be restricted as long as it is a method for forming the layer with a good adhesive property to the above hard coat layer, and capable of being used are, for example, a dry method such as a PVD method (physical vapor phase deposition method) including a vacuum deposition method and a sputtering method, a CVD method (chemical vapor phase deposition method) and a metalizing method, and a wet method using a coating liquid. Among these methods, a wet method is advantageous since the operation is simple and the photocatalytic function layer can readily be formed.

According to this wet method, prepared is a coating liquid comprising a dispersion containing the photocatalyst particles described above and an inorganic binder in a suitable solvent, and this coating liquid is coated by means of a conventionally known method, for example, a bar coating method, a knife coating method, a roll coating method, a blade coating method, a die coating method, a gravure coating method and a curtain coating method and is subjected to drying treatment, whereby a photocatalytic function layer can be formed.

The inorganic binder used for the coating liquid described above shall not specifically be restricted as long as it can display a function as a binder, and a cured matter of a silane compound is suited in terms of the adhesive property with the hard coat layer. In this case, capable of being preferably given as the above silane compound are compounds having no non-hydrolyzable organic group, for example, tetraalkoxysilanes such as tetramethoxysilane, tetraethoxysilane, tetra-n-propoxysilane, tetraisopropoxysilane, tetra-n-butoxysilane, tetraisobutoxysilane, tetra-sec-butoxysilane and tetra-tert-butoxysilane, and trialkoxysilane hydrides such as trimethoxysilane hydride, triethoxysilane hydride and tripropoxysilane hydride. These silane compounds may be used alone or in combination of two or more kinds thereof. Further, alkyltrialokoxysilane may be used in combination therewith in order to prevent cracks from being generated. A coating liquid can be prepared by adding photocatalyst particles, an inorganic binder such as the alkoxysilanes described above and a small amount of a hydrolysis catalyst to a suitable solvent. Drying treatment after coating can be carried out by subjecting the coated liquid to heating treatment at a temperature of 80 to 160° C. for 30 seconds to 5 minutes. If this drying temperature is lower than 80° C., the solvent is likely to remain in the hard coat layer or curing is likely to be insufficient. On the other hand, if it exceeds 160° C., contraction of the base material causes loss of the flatness.

Thus, the photocatalytic function layer comprising the photocatalyst particles and the inorganic binder is formed on the hard coat layer with a good adhesive property.

The photocatalyst particles used in this case have an average particle diameter falling in a range of usually 1 to 1000 nm, preferably 10 to 500 nm. A content ratio of the photocatalyst particles to the inorganic binder in the photocatalytic function layer falls preferably in a range of 1:9 to 9:1 in terms of a weight ratio. If an amount of the inorganic binder is more than the range described above, it is likely that the photocatalytic function is not sufficiently exhibited. On the other hand, if it is smaller than the range described above, a function as the binder is less liable to be sufficiently displayed. Thus, more preferred content ratio falls in a range of 3:7 to 7:3.

This photocatalytic function layer is activated on a surface thereof by irradiating with a UV ray, and hydrophilicity is displayed, but if it is disposed outdoors to try to activate it by a UV ray in the sunlight, a prescribed number of days is required. The activation is insufficiently displayed at an initial stage, so that the hydrophilicity is not obtained, and the contamination preventing property is not displayed. Accordingly, capable of being used in the present invention is a method in which this photocatalytic function layer is subjected to corona discharge treatment or plasma discharge treatment or irradiated with a laser beam to provide it with hydrophilicity from an initial stage.

In the present invention, the film in which used is a material comprising polycarbonate having a good weatherability as the base material and in which such photocatalytic function layer as described above is provided as the coating layer on the hard coat layer is particularly suited as a window film having a self-cleaning property and various contamination preventing members.

A layer comprising silica having substantially no organic group is preferably disposed between the hard coat layer and the photocatalytic function layer by a sol-gel method.

This photocatalytic function layer is also provided with an antibacterial function and a contamination preventing function due to its hydrophilicity.

Infrared Ray-Shielding Function Layer:

An infrared ray-absorbing material used in this infrared ray-shielding function layer can be classified roughly into an inorganic infrared ray-absorbing material and an organic infrared ray-absorbing material, and the inorganic infrared ray-absorbing material includes conventionally known compounds, for example, metal oxides such as zinc oxide, tin oxide, ATO (antimony-doped tin oxide), indium oxide and ITO (indium-doped tin oxide) and zinc sulfide. They may be used alone or in combination of two or more kinds thereof. Such metal oxides have an average particle diameter falling in a range of usually 1 to 10000 nm, preferably 10 to 1000 nm. On the other hand, the organic infrared ray-absorbing material includes conventionally known compounds, for example, cyanine base compounds, phthalocyanine base compounds, triallylmethane base compounds, naphthoquinone base compounds, anthraquinone base compounds, squalilium base compounds, thiol nickel complex salt base compounds, and amino compounds such as hydrochlorides, hydrofluorides, perchlorates, hexafluoroantimonates and fluoroborates of phenylenediaminiums. They may be used alone or in combination of two or more kinds thereof.

Among these infrared ray-absorbing materials, the inorganic infrared ray-absorbing materials are suited in terms of a weatherability and a scratch resistance.

A method for forming the infrared ray-shielding function layer on the hard coat layer shall not specifically be restricted as long as it is a method for forming the layer with a good adhesive property, and the infrared ray-shielding function layer can be formed by using, for example, the infrared ray-absorbing material described above and the inorganic binder or the organic binder. When using the inorganic binder, an inorganic material is preferably used as the infrared ray-absorbing material. When using the organic binder, either of inorganic and organic materials can be used as the infrared ray-absorbing material.

The inorganic binder shall not specifically be restricted, and a cured matter of a hydrolysis condensation product of the alkoxysilanes represented by Formula (I) described above is suited in terms of an adhesive property with the hard coat layer. In this case, prepared is a coating liquid containing the inorganic infrared ray-absorbing material particles and the alkoxysilanes represented by Formula (I) each described above and a small amount of a hydrolysis catalyst in a suitable solvent, and this coating liquid is coated on the hard coat layer by means of a conventionally known method, for example, a bar coating method, a knife coating method, a roll coating method, a blade coating method, a die coating method, a gravure coating method and a curtain coating method and is subjected to heating treatment at a temperature of 80 to 160° C. for 30 seconds to 5 minutes, whereby the infrared ray-shielding function layer can be formed. The reason why the heating treatment temperature falls preferably in the range described above is the same as explained in forming the hard coat layer described above.

On the other hand, the organic binder shall not specifically be restricted, and capable of being given are conventionally known compounds, for example, acryl base resins, polyester base resins, polyurethane base resins, butyral base resins and cured matters of ionizing radiation-curing type compounds. Among them, the cured matters of the ionizing radiation-curing type compounds are suited.

In this respect, UV ray-curing type compounds are preferred as the ionizing radiation-curing type compound, and to be specific, capable of being given are UV ray-curing type polyester acrylate resins, UV ray-curing type epoxy acrylate resins, UV ray-curing type urethane acrylate resins and various monomers and oligomers having photopolymerizable functional groups such as a (meth)acryloyl group. Further, usually added thereto is a photopolymerization initiator, for example, acetophenones, benzophenones, benzoins and phenyl ketones.

When using the cured matter of the ionizing radiation-curing type compound described above as the organic binder, prepared is a coating liquid in which the inorganic infrared ray-absorbing material or the organic infrared ray-absorbing material, the ionizing radiation-curing type compound and, if necessary, a solvent and various additives are dissolved or dispersed. The coating liquid is coated on the hard coat layer by means of a conventionally known method, for example, a bar coating method, a knife coating method, a roll coating method, a blade coating method, a die coating method, a gravure coating method and a curtain coating method to form a coating film, and this is irradiated with a UV ray or an electron beam after drying to cure the above coating film, whereby the infrared ray-shielding function layer can be formed.

The infrared ray-absorbing material in the infrared ray-shielding function layer thus formed has a content selected in a range of usually 20 to 80% by weight, preferably 30 to 70% by weight in the case of the inorganic infrared ray-absorbing material, and it is selected in a range of usually 0.1 to 15% by weight, preferably 0.5 to 10% by weight in the case of the organic infrared ray-absorbing material.

UV Ray-Shielding Function Layer:

A UV ray-shielding material used in this UV ray-shielding function layer can be classified roughly into a UV ray-scattering agent and a UV ray absorber.

In this respect, the UV ray-scattering agent is a material exerting a UV ray-shielding effect by scattering a UV ray, and inorganic materials such as metal oxide powder are mainly used. The examples of this UV ray-scattering agent include powders obtained by finely pulverizing titanium dioxide, zinc oxide and cerium oxide, hybrid inorganic powders prepared by subjecting titanium oxide fine particles to combining treatment with iron oxide and hybrid inorganic powders prepared by coating the surface of cerium oxide fine particles with amorphous silica. The UV ray-scattering effect is influenced by the particle diameter to a large extent. In the present invention, the UV ray-scattering agent has an average particle diameter falling in a range of preferably 3 μm or less, particularly preferably 1 nm to 1.5 μm. The UV ray-scattering agent may be used alone or in combination of two or more kinds thereof.

On the other hand, the UV ray absorber exerts a UV ray-shielding effect by absorbing a UV ray having high energy to convert it to harmless energy and radiating it again. It can usually be classified into a salicylate base, a benzophenone base, a benzotriazole base, a substituted acrylonitrile base and others. This UV ray absorber may be used alone or in combination of two or more kinds thereof. Further, a compound elevating the light fastness and the weatherability such as a hindered amine base may be used, if desired, as a light stabilizer in combination with the UV ray absorber described above.

A method for forming the UV ray-shielding function layer shall not specifically be restricted as long as it is a method for forming the layer with a good adhesive property, and the UV ray-shielding function layer can be formed by using, for example, the UV ray-shielding material and the inorganic binder or the organic binder each described above. When using the inorganic binder, an inorganic UV ray-scattering agent is preferably used as the UV ray-shielding material. When using the organic binder, either of the inorganic UV ray-scattering agent and the organic UV ray absorber can be used as the UV ray-shielding material.

A method for forming the UV ray-shielding function layer on the hard coat layer using the inorganic binder or the organic binder is the same as explained in forming the infrared ray-shielding function layer described above.

A content of the UV ray-shielding material in the UV ray-shielding function layer thus formed is selected in a range of usually 0.1 to 10% by weight, preferably 1 to 5% by weight when the UV ray-shielding material is the UV ray-scattering agent, and it is selected in a range of usually 0.01 to 10% by weight, preferably 0.05 to 5% by weight when the UV ray-shielding material is the UV ray absorber or the light stabilizer.

Antibacterial Function Layer:

In this antibacterial function layer, used as an antibacterial agent are, for example, silver base inorganic antibacterial agents such as conventionally known silver base inorganic antibacterial agents using zirconium phosphate as a carrier, silver base inorganic antibacterial agents using zeolite as a carrier, silver base inorganic antibacterial agents using calcium phosphate as a carrier and silver base inorganic antibacterial agents using silica gel as a carrier, amino acid base organic antibacterial agents prepared by blending amino acid compounds and nitrogen-containing sulfur base organic antibacterial agents prepared by blending nitrogen-containing sulfur base compounds. The silver base inorganic antibacterial agents have an average particle diameter falling in a range of usually 0.1 to 20 μm, preferably 1 to 10 μm.

When forming the antibacterial function layer on the hard coat layer, added to a suitable solvent in a suitable proportion are, for example, an organic binder such as an acryl base resin, a polyester base resin and a polyurethane base resin or an inorganic binder such as a silane compound and the antibacterial agent described above, and they are dispersed or dissolved to prepare a coating liquid. The coating liquid is coated on the hard coat layer by means of a conventionally known method, for example, a bar coating method, a knife coating method, a roll coating method, a blade coating method, a die coating method, a gravure coating method and a curtain coating method, and it is subjected to drying treatment, whereby the desired antibacterial function layer can be formed.

The antibacterial agent in the antibacterial function layer thus formed has a content selected in a range of usually 0.5 to 30% by weight, preferably 1 to 10% by weight.

Contamination Preventing Function Layer:

In this contamination preventing function layer, capable of being used as the contamination preventing agent is, for example, a coating liquid containing a fluororesin such as hexafluoroethylene.propylene copolymers, tetrafluoroethylene.ethylene copolymers, tetrafluoroethylene.propylene copolymers and tetrafluoroethylene.hexafluoropropylene copolymers. When forming the contamination preventing function layer on the hard coat layer, the coating liquid containing the fluororesin described above is coated on the hard coat layer by means of a conventionally known method, for example, a bar coating method, a knife coating method, a roll coating method, a blade coating method, a die coating method, a gravure coating method and a curtain coating method, and it is subjected to drying treatment, whereby the desired contamination preventing function layer can be formed.

The fluororesin in the contamination preventing function layer thus formed has a content selected in a range of usually 5 to 60% by weight, preferably 10 to 50% by weight.

Antistatic Function Layer:

It is a layer having a function for preventing charge and formed by coating a liquid prepared by dispersing a conductive filler such as a metallic conductive filler, a non-metallic conductive filler and a carbon base conductive filler and an antistatic agent comprising an organic antistatic agent in a binder comprising an organic compound.

The antistatic agent shall not specifically be restricted, and all of conventionally known compounds can be used. The metallic conductive filler includes, for example, conductive fillers such as Ag, Cu, Al, Ni, Sn, Fe, Pb, Ti, Mo, W, Ta, Nb, Pt, Au, Pd, Cu—Sn alloy and Cu—Zn alloy; the non-metallic conductive filler includes, for example, conductive fillers such as zinc antimonate, a zinc oxide base, a barium sulfate base, a titanium oxide base, an aluminum borate base, a tin oxide base, a titan black base, a potassium titanate base and indium oxide base; and the carbon base conductive filler includes, for example, carbon black. Such conductive fillers have an average particle diameter falling in a range of usually 1 to 1000 nm, preferably 10 to 500 nm. Further, the organic antistatic agent includes, for example, cationic organic antistatic agents, anionic organic antistatic agents and nonionic organic antistatic agents. These antistatic agents may be used alone or in combination of two or more kinds thereof.

Used as the binder described above are, for example, high molecular polymers of an acryl base, a urethane base, a polyester base, an epoxy base, a polyvinyl chloride base, a melamine base, a polyimide base and a silicone base, and additives such as a cross-linking agent are blended if necessary. Further, capable of being suitably used as well are the ionizing radiation-curing type compounds such as the UV ray-curing type resins which were described above as the organic binder.

When forming the antistatic function layer on the hard coat layer, for example, the antistatic agent and the binder are added to a suitable solvent to prepare a coating liquid having a suitable concentration, and it is coated on the hard coat layer by means of a conventionally known method, for example, a bar coating method, a knife coating method, a roll coating method, a blade coating method, a die coating method, a gravure coating method and a curtain coating method and subjected to drying treatment, whereby the antistatic function layer can be formed.

The antistatic function layer has preferably a thickness of 0.1 to 20 $\mu$m. If it is less than 0.1 $\mu$m, the antistatic effect can not be obtained. On the other hand, if it exceeds 20 $\mu$m, the transparency is likely to be lowered.

The antistatic agent in the antistatic function layer thus formed has a content selected in a range of 20 to 90% by weight in the case of the metallic and non-metallic conductive fillers, 0.1 to 60% by weight in the case of the carbon base conductive filler and 1 to 20% by weight in the case of the organic antistatic agent. If the content is less than the lower limit value in the range described above, the antistatic effect can not be obtained. On the other hand, if it exceeds the upper limit value, the strength is likely to be reduced.

The antistatic function layer having such structure has a surface resistivity (JIS K 8911) of $10^9$ $\Omega/\square$ or less, and the satisfactory antistatic property is obtained.

Color Developing Function Layer:

It is a layer having a function for coloring by irradiating with a UV ray and is formed by coating a mixture of a fluorescent substance and a binder such as a polyester resin and a vinyl chloride resin.

Suitable fluorescent substances can be used for the fluorescent substance as long as they are fluorescent substances which are colored by reacting with a UV ray. Such fluorescent substance may be either an organic fluorescent substance or an inorganic fluorescent substance and emits fluorescence having a suitable color such as blue, green, yellow, orange and red depending on the components. Capable of being given as the specific examples of the fluorescent substance are derivatives of anthracene, chrysene, pyrene, quinazolone and porphyrin and dansyl dyes. These fluorescent substances may be used alone or in combination of two or more kinds thereof.

When forming the color developing function layer on the hard coat layer, for example, the fluorescent substance and the binder are added to a suitable solvent to prepare a coating liquid having a suitable concentration, and it is coated on the hard coat layer by means of a conventionally known method, for example, a bar coating method, a knife coating method, a roll coating method, a blade coating method, a die coating method, a gravure coating method and a curtain coating method and subjected to drying treatment, whereby the color developing function layer can be formed.

A content of the fluorescent substance in the color developing function layer thus formed is different according to the kind of the fluorescent substance and the purpose of the color developing function layer, and it is selected in a range of usually 0.1 to 30% by weight, preferably 1 to 20% by weight.

Cloudiness Preventing Function Layer:

It is a layer having a function for preventing cloudiness by having a high hydrophilicity and a high water absorptive property. A hydrophilic resin such as, for example, polyacrylic acid, poly-sodium acrylate and polyvinyl alcohol and colloidal silica or colloidal alumina are dispersed in a binder comprising the hydrophilic resin and the silane compound each described above to prepare a coating liquid, and it is coated on the hard coat layer by means of a conventionally known method, for example, a bar coating method, a knife coating method, a roll coating method, a blade coating method, a die coating method, a gravure coating method and a curtain coating method and subjected to drying treatment, whereby the cloudiness preventing function layer can be formed.

When using colloidal silica or colloidal alumina, colloidal silica or colloidal alumina in the cloudiness preventing function layer has a content selected in a range of usually 5 to 90% by weight, preferably 10 to 70% by weight.

The cloudiness preventing function layer has preferably a thickness of 0.1 to 20 $\mu$m. If it is less than 0.1 $\mu$m, the cloudiness preventing effect can not be obtained. On the other hand, if it exceeds 20 $\mu$m, the adhesive property between the cloudiness preventing function layer and the hard coat layer is likely to be reduced.

When the hard coat film of the present invention is used for use in sticking on an adherent, an adhesive layer and a release sheet can be disposed in order on a face opposite to a side of the base material on which the hard coat layer is provided.

The adhesive constituting the adhesive layer described above shall not specifically be restricted and can suitably be selected from conventionally known various adhesives according to the circumstances and used. Acryl base, urethane base and silicone base adhesives are particularly suited in terms of weatherability. This adhesive layer has a thickness falling in a range of usually 5 to 100 $\mu$m, preferably 10 to 60 $\mu$m. A UV absorber and a light stabilizer can be added, if necessary, to the adhesive layer described above.

The release sheet superposed on this adhesive layer includes, for example, matters prepared by coating a release agent such as a silicone resin on paper such as glassine paper, coat paper and laminate paper and various plastic films. A thickness of this release sheet shall not specifically be restricted and is usually 20 to 150 μm.

The hard coat film of the present invention is suitably used for sticking on outside surfaces of window glasses and plastic boards for windows. In using it, the release sheet is peeled off, and the film is stuck so that the adhesive layer face is brought into contact with an object.

Figure 1:
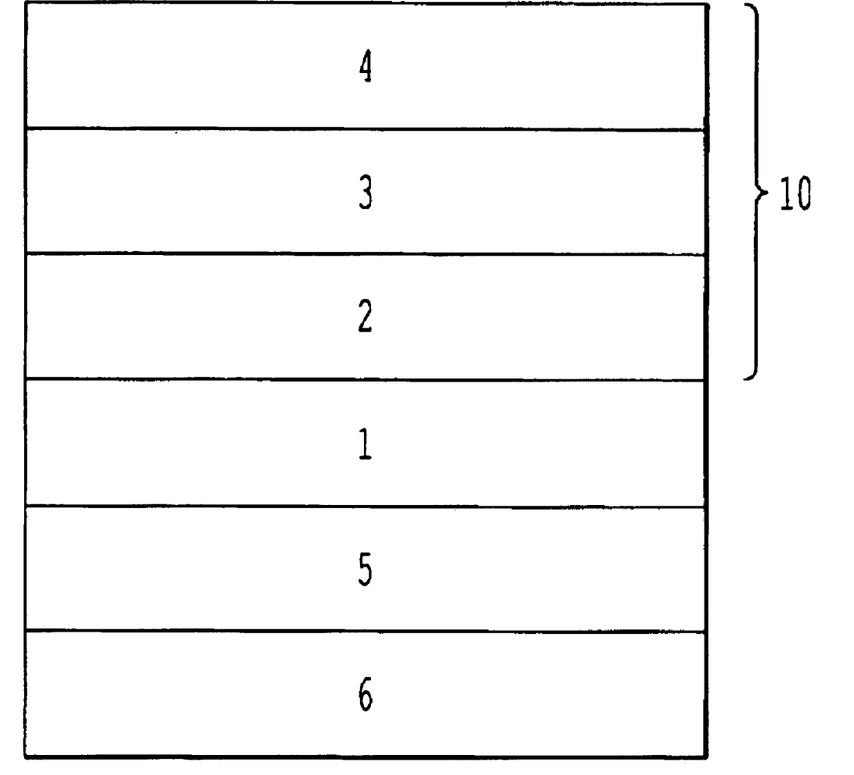
FIG. 1 is a cross section showing one example of the structure of the hard coat film of the present invention.

FIG. 1 is a cross section showing a structure which is one example of the hard coat film of the present invention, and a hard coat film 10 has a structure in which a hard coat layer 3 is disposed on one face of a base material 1 via a primer layer 2 and a coating layer 4 is further superposed thereon, if necessary, and in which an adhesive layer 5 and a release sheet 6 are superposed, if necessary, in order on an opposite face of the base material 1.

EXAMPLES

Next, the present invention shall be explained in further details with reference to examples, but the present invention shall by no means be restricted by these examples.

The physical properties of the hard coat films prepared in the respective examples were determined according to the following procedures.

(1) Extent of Curl Generated

The hard coat film before coating the adhesive was left standing for 24 hours under the environment of a temperature of 23° C. and a relative humidity of 50% and then cut to a square of 10 cm×10 cm, and it was placed on a flat glass plate to measure distances between four corners of the hard coat film and the glass plate. An average value thereof was set as a curl height.

(2) Accelerated Weatherability Test

The hard coat film was stuck on a glass plate to carry out an accelerated weatherability test for 100 hours by means of a sunshine super long life weather meter ([WEL-SUN-HCH], manufactured by Suga Tester Co., Ltd.), and then evaluated were the hard coating property, deterioration of the base material and the hydrophilicity.

(a) Hard Coating Property

The surface of the hard coat layer in Example 1 and the surfaces of the coating layers in Examples 2 to 12 and Comparative Example 1 were rubbed three times with steel wool #0000, and then the change thereof was visually observed.

(b) Deterioration of Hard Coat Film

The presence of cracks produced on the hard coat film was visually observed.

(c) Hydrophilicity

Waterdrops were dropped on the surfaces of the coating layers (photocatalytic function layer) in Examples 2 to 5 and Comparative Example 1 from a microsyringe by means a contact angle measuring meter (brand name [CA-X150], manufactured by Kyowa Kaimen Kagaku Co., Ltd.), and then a contact angle to water was measured after 30 minutes.

Example 1

Preparation of Hard Coat Film

A coating liquid prepared by adding 2 parts by weight of 2,4-dihydroxybenzophenone as a UV absorber per 100 parts by weight of a resin component of a polyester resin (brand name [Byron 20SS], manufactured by Toyo Boseki Co., Ltd.) was coated on one face of a polycarbonate film (brand name [Lexan 8010], manufactured by Sansei Bussan Co., Ltd.) having a thickness of 100 μm so that the thickness after drying was 1 μm, and it was subjected to drying treatment at 100° C. for one minute to form a primer layer. Next, 98 parts by weight of antimony-doped tin oxide (ATO) (average particle diameter: 100 nm, manufactured by Ishihara Techno Co., Ltd.) as metal oxide particles was added to a liquid prepared by adding methanol and a catalytic amount of nitric acid to a mixture of silane compounds comprising 50 parts by weight of tetramethoxysilane, 45 parts by weight of methyltrimethoxysilane and 5 parts by weight of trimethoxysilane hydride to prepare a coating liquid. Then, this coating liquid was coated on the primer layer described above so that the thickness after drying was 10 μm, and it was subjected to drying treatment by heating at 130° C. for 3 minutes to form a hard coat layer. A weight ratio of ATO to a cured matter of the silane compound in this hard coat layer is 7:3.

Next, an acryl base adhesive (brand name [PU-V], manufactured by LINTEC Corporation) was coated on the other face of the polycarbonate film described above so that the thickness after drying was 20 μm, and after drying treatment, a release sheet (brand name [SP-PET2511], manufactured by LINTEC Corporation) was superposed on thus formed adhesive layer, whereby a hard coat film was prepared. The evaluation results of the physical properties of this hard coat film are shown in Table 1.

Example 2

Preparation of Hard Coat Film Having a Photocatalytic Function Layer

A primer layer and a hard coat layer were provided in order on one face of a polycarbonate film in the same manner as in Example 1. Then, a coating liquid prepared by mixing 100 parts by weight of a titanium dioxide dispersion (brand name [TF23B], manufactured by Dainippon Ink & Chemicals Ind. Co., Ltd.; solid matter concentration: 10% by weight, average particle diameter: 100 nm) as a photocatalytic particle and 1320 parts by weight of an alkoxysilane solution which was a silane compound (brand name [Colcoat P], manufactured by Colcoat Co., Ltd.; solid matter concentration: 2% by weight) as an inorganic binder was coated on this hard coat layer so that the thickness after drying was 1 μm, and it was subjected to drying treatment at 100° C. for 2 minutes to form a photocatalytic function layer. A weight ratio of titanium dioxide to a cured matter of the silane compound in this photocatalytic function layer is 5:5.

Next, the acryl base adhesive (brand name [Pu—V], manufactured by LINTEC Corporation) was coated on an opposite side face of the polycarbonate film described above so that the thickness after drying was 20 μm and after drying treatment, the release sheet (brand name [SP-PET2511], manufactured by LINTEC Corporation) was superposed on thus formed adhesive layer, whereby a hard coat film having a photocatalytic function layer was prepared. The evaluation results of the physical properties of this film are shown in Table 1.

Example 3

Preparation of Hard Coat Film Having a Photocatalytic Function Layer

An acryl resin (brand name [Primer 85B-2], manufactured by Nippon Dacroshamloc Co., Ltd.) was coated on one face of the polycarbonate film (brand name [Lexan 8010], manufactured by Sansei Bussan Co., Ltd.) having a thickness of 100 μm so that the thickness after drying was 5 μm, and it was subjected to drying treatment at 100° C. for one minute to form a primer layer. Next, a coating liquid prepared by adding 10 parts by weight of antimony-doped tin oxide (ATO) (manufactured by Ishihara Techno Co., Ltd., average particle diameter: 100 nm) to 1320 parts by weight of the alkoxysilane solution (brand name [Colcoat P], manufactured by Colcoat Co., Ltd.; solid matter concentration: 2% by weight) was coated on this primer layer so that the thickness after drying was 10 μm, and it was subjected to drying treatment by heating at 100° C. for 2 minutes to form a hard coat layer. A weight ratio of ATO to a cured matter of the silane compound in this hard coat layer is 5:5.

Next, a coating liquid prepared by mixing 100 parts by weight of a titanium dioxide dispersion (brand name [Paltitan 5603], manufactured by Nihon Parkerizing Co., Ltd.; solid matter concentration: 4% by weight, average particle diameter: 15 nm) and 20 parts by weight of an alkoxysilane solution (brand name [Paltitan 5601B], manufactured by Nihon Parkerizing Co., Ltd.; solid matter concentration: 52% by weight) was coated on this hard coat layer so that the thickness after drying was 2 μm, and it was subjected to drying treatment by heating at 100° C. for 2 minutes to form a photocatalytic function layer. A weight ratio of titanium dioxide to a cured matter of the silane compound in this photocatalytic function layer is 5:5.

Next, the acryl base adhesive (brand name [PU-V], manufactured by LINTEC Corporation) was coated on an opposite side face of the polycarbonate film described above so that the thickness after drying was 20 μm and after drying treatment, the release sheet (brand name [SP-PET2511], manufactured by LINTEC Corporation) was superposed on thus formed adhesive layer, whereby a hard coat film having a photocatalytic function layer was prepared. The evaluation results of the physical properties of this film are shown in Table 1.

Example 4

Preparation of Hard Coat Film Having Photocatalytic Function Layer

The same procedure as in Example 3 was carried out to prepare a hard coat film having a photocatalytic function layer, except that in Example 3, a coating liquid prepared by mixing 100 parts by weight of the titanium dioxide dispersion (brand name [TF23B], manufactured by Dainippon Ink & Chemicals Ind. Co., Ltd.; solid matter concentration: 10% by weight, average particle diameter: 100 nm) and 1320 parts by weight of the alkoxysilane solution (brand name [Colcoat P], manufactured by Colcoat Co., Ltd.; solid matter concentration: 2% by weight) was coated on the hard coat layer so that the thickness after drying was 1 μm, and it was subjected to drying treatment by heating at 100° C. for 2 minutes to form a photocatalytic function layer. A weight ratio of titanium dioxide to a cured matter of the silane compound in this photocatalytic function layer is 5:5. The evaluation results of the physical properties of this film are shown in Table 1.

Example 5

Preparation of Hard Coat Film Having a Photocatalytic Function Layer

The same procedure as in Example 4 was carried out to prepare a hard coat film having a photocatalytic function layer, except that in Example 4, provided was a 100% silica layer obtained by coating the alkoxysilane solution (brand name [Colcoat P], manufactured by Colcoat Co., Ltd.) between the hard coat layer and the photocatalytic function layer so that the thickness after drying was 0.5 μm and drying it (100° C., 2 minutes). The evaluation results of the physical properties of this film are shown in Table 1.

Example 6

Preparation of Hard Coat Film Having an Infrared Ray-Shielding Function Layer

The same hard coat layer as in Example 3 was formed, and then a coating liquid prepared by adding 100 parts by weight of a UV ray-curing type compound dipentaerythritol hexaacrylate (brand name [Aronix M-305], manufactured by Toa Gosei Co., Ltd.) and 5 parts by weight of a photoinitiator (brand name [Irugacure 184], manufactured by Ciba Specialty Chemicals Co., Ltd.) to 300 parts by weight of an ATO dispersion (brand name [SNS-10T], manufactured by Ishihara Sangyo Co., Ltd.; solid matter concentration: 30% by weight, average particle diameter: less than 100 nm) and diluting the mixture with a toluene solvent was coated on the hard coat layer so that the thickness after drying was about 2 μm, and it was subjected to drying treatment at 80° C. for one minute. Then, it was irradiated with a UV ray (luminous energy: 200 mJ/cm$^2$) and cured to prepare a hard coat film having an infrared ray-shielding function layer. ATO in this infrared ray-shielding function layer has a content of 46% by weight.

A spectral transmission factor of this sample was measured by means of a spectrophotometer (brand name [UVPC-3101], manufactured by Shimadzu Seisakusho Co., Ltd.) to find that the transmission factor in a wavelength side longer than 2000 nm was less than 30%.

Example 7

Preparation of Hard Coat Film Having an Antistatic Function Layer

The same hard coat layer as in Example 3 was formed, and then a mixed liquid of 100 parts by weight of the UV ray-curing type compound dipentaerythritol hexaacrylate (brand name [Aronix M-305], manufactured by Toa Gosei Co., Ltd.), 5 parts by weight of the photoinitiator (brand name [Irugacure 184], manufactured by Ciba Specialty Chemicals Co., Ltd.), 50 parts by weight of a methyl alcohol solution (solid matter concentration: 60% by weight) of a zinc antimonate sol having an average particle diameter of 15 nm (brand name [Selnax CX-Z610M-FA], manufactured by Nissan Chemical Ind. Co., Ltd.) as a conductive filler and 100 parts by weight of isobutyl alcohol was coated on the hard coat layer so that the thickness after drying was about 2 μm, and it was subjected to drying treatment at 120° C. for one minute. Then, it was irradiated with a UV ray (luminous energy: 300 mJ/cm$^2$) and cured to obtain an antistatic function layer. Zinc antimonate in this antistatic function layer has a content of 22% by weight.

A surface resistivity of this sample was measured by means of a digital electrometer (manufactured by Advantest Co., Ltd.) to find that it was $8.5 \times 10^7$ Ω/□.

Example 8

Preparation of Hard Coat Film Having an Antibacterial Function Layer

The same hard coat layer as in Example 3 was formed, and then a coating liquid prepared by blending 100 parts by weight of the alkoxysilane solution (brand name [Colcoat P], manufactured by Colcoat Co., Ltd., solid matter concentration: 2%) with 3 parts by weight of a silver base inorganic antibacterial agent [silver-carried zeolite antibacterial agent (silver-carried amount: 0.6% by weight); average particle diameter: 2 μm, manufactured by Shinagawa Nenryo Co., Ltd.] was coated on the hard coat layer so that the thickness after drying was 5 μm, and it was subjected to drying treatment by heating at 100° C. for 2 minutes to obtain an antibacterial function layer. The silver base inorganic antibacterial agent in this antibacterial function layer has a content of 7.3% by weight.

An antibacterial test of this antibacterial function layer resulted in finding the following measured bacterial number.
1. *Staphylococcus aureus*: $1.2 \times 10^2$ bacterium/ml after one hour, not detected after 6 hours and not detected after 24 hours.
2. Colibacillus: $1.8 \times 10^2$ bacterium/ml after one hour, not detected after 6 hours and not detected after 24 hours.

The antibacterial test was carried out by the following method.

A suspension 0.5 ml of the bacteria prepared by means of a 1/500 nutrienbross was dropped on the antibacterial layer, and it was covered with a polyethylene film and preserved at 35° C. for one hour, 6 hours and 24 hours. After preserving for each time, each antibacterial layer was washed with 10 ml of a sterilized SCDLP liquid culture medium to determine the number of the bacterium remaining in the liquid using an agar culture medium for bacterial number measurement by a pour plate method.

Example 9

Preparation of Hard Coat Film Having a Color Developing (Fluorescent) Function Layer The same hard coat layer as in Example 3 was formed, and then a mixed liquid of 3 parts by weight of a fluorescent substance (brand name [Kayalite B], manufactured by Nippon Kayaku Co., Ltd.), 100 parts by weight of a polyester resin (brand name [Byron 200], manufactured by Toyo Boseki Co., Ltd.) and 300 parts by weight of ethyl acetate was coated on the hard coat layer so that the thickness after drying was 5 μm, and it was dried at 100° C. for one minute to obtain a color developing function layer. The fluorescent substance in this color developing function layer has a content of 2.9% by weight.

The color developing layer was irradiated for 30 seconds/5 cm with a UV ray lamp having a central wavelength of 330 nm, and the distinguishability was visually evaluate, which was resulted in finding that color developing could be observed.

Example 10

Preparation of Hard Coat Film Having a Cloudiness Preventing Function Layer

The same hard coat layer as in Example 3 was formed, and then a liquid prepared by mixing 5 parts by weight of colloidal silica (brand name [RS443], manufactured by Chemat Technology Inc.) with 100 parts by weight of the alkoxysilane solution (brand name [Colcoat P], manufactured by Colcoat Co., Ltd., solid matter concentration: 2%) was coated on the hard coat layer so that the thickness after drying was 2 μm, and it was dried at 100° C. for 2 minutes and then subjected to corona discharge treatment to obtain a cloudiness preventing function layer. The colloidal silica in this cloudiness preventing function layer has a content of 57% by weight.

The film was adhered on glass in a bath room in which a bath tub (40° C.) of 1 m×1 m was disposed to visually evaluate a cloudiness preventing property after one hour, which resulted in finding that cloudiness was not observed on the glass and that the cloudiness preventing property was good.

Example 11

Preparation of Hard Coat Film Having a Contamination Preventing Function Layer

The same hard coat layer as in Example 3 was formed, and then a liquid prepared by adding 30 parts by weight of the alkoxysilane solution (brand name [Colcoat P], manufactured by Colcoat Co., Ltd.) to 10 parts by weight of a tetrafluoroethylene.propylene copolymer (brand name [AFLAS 150E], manufactured by Asahi Glass Co., Ltd.) as a fluorine base resin and diluting the mixture with xylene was coated on the hard coat layer so that the thickness after drying was 3 μm, and it was dried at 100° C. for one minute to prepare a hard coat film having a contamination preventing function layer. The fluorine base resin in this contamination preventing function layer has a content of 47% by weight.

This hard coat film was disposed outdoors, and contamination on the surface was visually evaluated after half a year, which resulted in finding that a little contamination was observed but could readily be wiped off.

Example 12

Preparation of Hard Coat Film Having a UV Ray-Shielding Function Layer

The same hard coat layer as in Example 3 was formed, and then a liquid prepared by mixing 0.03 part by weight of a cerium oxide base UV ray-shielding material (brand name [Ceriguard S-3018-02], manufactured by Nippon Inorganic Chemical Ind. Co., Ltd.) with 100 parts by weight of the alkoxysilane solution (brand name [Colcoat P], manufactured by Colcoat Co., Ltd.) was coated on the hard coat layer so that the thickness after drying was 2 μm, and it was dried at 100° C. for 2 minutes to prepare a hard coat film having a UV ray-shielding function layer. The UV ray-shielding material in this UV ray-shielding function layer has a content of 3.8% by weight.

A UV ray-shielding property of the hard coat film thus obtained was measured by means of a spectrophotometer (brand name [UV2200], manufactured by Shimadzu Seisakusho Co., Ltd.), which resulted in finding that a wavelength of 350 nm or less was shielded.

Comparative Example 1

Preparation of Hard Coat Film Having a Photocatalytic Function Layer

The same procedure as in Example 2 was carried out to prepare a hard coat film having a photocatalytic function layer, except that ATO was not added in forming the hard coat layer in Example 2, and the physical properties thereof were evaluated. The results thereof are shown in Table 1.

Cracks were observed to be produced in an accelerated weatherability test for 100 hours by means of a sunshine super long life weather meter.

TABLE 1

| | Accelerated weatherability test (after 100 hours) | | | |
|---|---|---|---|---|
| | Hard coating property (steel wool #0000) | Generation of cracks (visual observation of appearance) | Hydrophilicity (water contact angle) (degree) | Curl height (mm) |
| Example 1 | No scratches | None | — | 0 |
| Example 2 | No scratches | None | 5 or less | 0 |
| Example 3 | No scratches | None | 5 or less | 0 |
| Example 4 | No scratches | None | 5 or less | 0 |
| Example 5 | No scratches | None | 5 or less | 0 |
| Example 6 | No scratches | None | — | 0 |
| Example 7 | No scratches | None | — | 0 |
| Example 8 | No scratches | None | — | 0 |
| Example 9 | No scratches | None | — | 0 |
| Example 10 | No scratches | None | — | 0 |
| Example 11 | No scratches | None | — | 0 |
| Example 12 | No scratches | None | — | 0 |
| Comparative Example 1 | Scratched | Present | 5 or less | 3 |

EFFECTS OF THE INVENTION

The hard coat film of the present invention has an inorganic hard coat layer which is excellent in a scratch resistance and a weatherability and in which curling is inhibited from being generated and the coating layer having various functions which is provided thereon if desired. It is particularly suitably used for sticking on outside faces of window glasses and plastic boards for windows in lofty buildings and sticking on show windows.

What is claimed is:

1. A hard coat film which comprises a laminate wherein a primer layer and a hard coat layer comprising metal oxide particles and a cured matter of a silane compound are laminated in order on one face of a base material.

2. The hard coat film as described in claim 1, wherein a coating layer having a composition different than the composition of the hard coat layer is further provided on the hard coat layer.

3. The hard coat film as described in claim 2, wherein the coating layer is a layer having at least one function selected from a photocatalytic function, an infrared ray-shielding function, a UV ray-shielding function, an antibacterial function, a contamination preventing function, an antistatic function, a color developing function and a cloudiness preventing function.

4. The hard coat film as described in claim 3, wherein the coating layer is a photocatalytic function layer, and the base material comprises polycarbonate.

5. The hard coat film as described in any one of claims 1 to 4, wherein an adhesive layer is provided on the other face of the base material.

6. The hard coat film as described in claim 1, wherein the hard coat layer is inorganic.

7. The hard coat film as described in claim 1, wherein the metal oxide particles have an average particle diameter in a range of from 20 to 200 nm.

8. The hard coat film as described in claim 1, wherein the metal oxide particles are amorphous.

9. The hard coat film as described in claim 1, wherein the silane compound is selected from the group consisting of alkoxysilane compounds and chlorosilane compounds.

10. The hard coat film as described in claim 1, wherein the silane compound is selected from the group consisting of tetraalkoxysilanes, trialkoxysilane hydrides and dialkoxysilane dihydrides.

11. The hard coat film as described in claim 1, wherein the cured matter of a silane compound is produced by heating the silane compound at a temperature in a range of from 80 to 160° C. for a period of time in a range of from 30 seconds to 5 minutes.

12. The hard coat film as described in claim 1, wherein the hard coat layer consists of the metal oxide particles and the cured matter of a silane compound.

13. The hard coat film as described in claim 1, wherein in the hard coat layer a weight ratio of the metal oxide particles to the cured matter of the silane compound is in a range of 8:2 to 2:8.

14. The hard coat film as described in claim 1, wherein the hard coat layer has a thickness in a range of from 1 to 20 μm.

15. The hard coat film as described in claim 1, wherein the primer comprises a material selected from the group consisting of an acryl base, a polyester base, a polyurethane base, a silicone base and a rubber base.

16. The hard coating film as described in claim 1, wherein the base material comprises a plastic.

17. A method of making a hard coat film, the method comprising laminating on a base material a primer layer and a bard coat layer; and producing the hard coat film of claim 1.

* * * * *